(12) United States Patent
Desai

(10) Patent No.: US 11,356,384 B1
(45) Date of Patent: Jun. 7, 2022

(54) MODELLING AND PREDICTING RESOURCE ALLOCATION USING EIGENVALUES AND EIGENVECTORS

(71) Applicant: EMC IP Holding Company LLC, Hopkinton, MA (US)

(72) Inventor: Keyur Desai, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/211,689

(22) Filed: Mar. 24, 2021

(51) Int. Cl.
*H04L 47/78* (2022.01)
*H04L 47/70* (2022.01)
*H04L 47/762* (2022.01)
*G06F 11/30* (2006.01)

(52) U.S. Cl.
CPC ........ *H04L 47/781* (2013.01); *G06F 11/3006* (2013.01); *H04L 47/762* (2013.01); *H04L 47/822* (2013.01)

(58) Field of Classification Search
CPC .... H04L 47/781; H04L 47/762; H04L 47/822
See application file for complete search history.

(56) References Cited

U.S. PATENT DOCUMENTS

| 2008/0134173 | A1* | 6/2008 | Abbondanzio | ....... G06F 9/5077 718/1 |
| 2014/0282591 | A1* | 9/2014 | Stich | ........................ G06F 9/50 718/104 |
| 2018/0068246 | A1* | 3/2018 | Crivat | .............. G06Q 10/06313 |

* cited by examiner

*Primary Examiner* — Tonia L Dollinger
*Assistant Examiner* — Jihad K Boustany
(74) *Attorney, Agent, or Firm* — Staniford Tomita LLP

(57) ABSTRACT

A state of resource allocation is represented as a matrix. Each intersection of a row and column of the matrix indicates a number of units of a resource being provided by a respective node and consumed by a respective client. The allocation is modeled using a characteristic equation of the matrix. The characteristic equation is applied to the matrix to find an eigenvalue indicating a degree of scale the allocation can tolerate. An eigenvector is found for the eigenvalue to determine a direction of scale. A prediction is made as to whether the current state can scale at least one of upwards or downwards by the eigenvector.

18 Claims, 6 Drawing Sheets

US 11,356,384 B1

MODELLING AND PREDICTING RESOURCE ALLOCATION USING EIGENVALUES AND EIGENVECTORS

TECHNICAL FIELD

The present invention relates generally to information processing systems, and more particularly to allocating resources.

BACKGROUND

It is desirable to scale computer system resources in response to demand. Demand for resources can fluctuate greatly over time. In a distributed or scale-out environment, the allocation of resources is a challenging task. Clients request resources from a node cluster that produces the resources. Resources, however, are finite. The resources available from a node are limited by that node's hardware and processing power. Many systems lack the intelligence to predict and equitably allocate the resources of the nodes among the clients. One or more clients may acquire an excess of resources to the detriment of one or more other clients. As a result, a task or other job may require an additional amount of time to complete. Instead or additionally, one or more nodes of the cluster may become overtaxed resulting in a degradation in performance of the cluster or even a system outage.

Thus, there is a need for improved systems and techniques for allocating resources.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
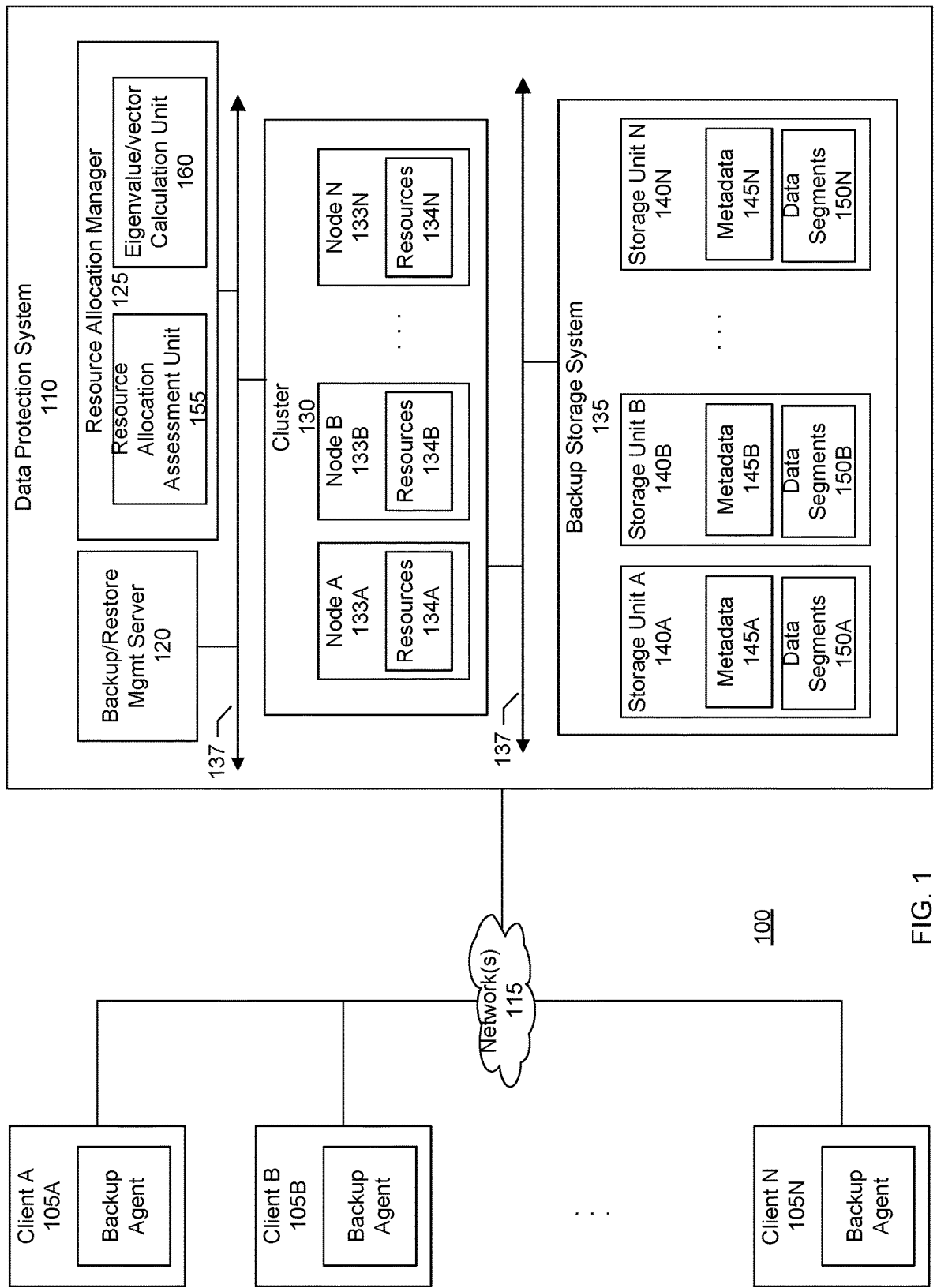
FIG. 1 shows a block diagram of an information processing system for modelling and predicting resource allocation using eigenvalues and eigenvectors, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

Disclosed herein are methods and systems for modelling and predicting computer system resource allocation using eigenvalues and eigenvectors. FIG. 1 shows a block diagram of an information processing system 100 within which such methods and systems may be implemented according to one or more embodiments. In the example shown in FIG. 1 there are a set of clients 105A-N, a data protection system 110, and a network 115 connecting the clients to the data protection system. The data protection system includes a backup management server 120, resource allocation manager 125, node or server cluster 130 having nodes 133A-N with resources 134A-N, backup storage system 135, and an interconnect 137 (bus or network) connecting the various components of the data protection system.

The cluster may support a file system distributed across one or more nodes of the cluster. For example, files, directories, or both of the file system may be spanned across the one or more nodes of the cluster. The distributed file system, in addition to the actual files, file data, or content, may include metadata and metadata structures such as tree data structures (e.g., m-trees), namespace, and pointers and references. The metadata and metadata structures may span across multiple nodes of the cluster. Operations such as a backup or restore may involve accessing, reading, updating, manipulating, and traversing across these data structures to ensure that files and other objects in the file system are properly backed up, restored, referenced, or organized.

The clients may include servers, workstations, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data protection system with backup management server is responsible for backing up data of the clients to the backup storage system and restoring the data to the clients. The clients may issue requests for data protection operations such as backup and restore. The data to be backed up may be located in source storage devices locally attached to the clients or in storage remote from the clients and accessible over the network. In an embodiment, the data protection system includes a deduplication engine. When a file or other data object is received for backup storage, the deduplication engine splits the object into a set of data segments and calculates a fingerprint for each segment. The fingerprints are compared against a fingerprint index corresponding to fingerprints of segments previously stored. A non-matching fingerprint indicates that a corresponding segment is new and the segment may be stored. A matching fingerprint indicates that the corresponding segment was previously stored and may not be again stored. Instead, a reference and other metadata may be generated to refer to the previously stored segment. The metadata allows the file or other data object to be reconstructed using the previously stored segment. The segments may be stored in a deduplicated and compressed format different from their native source format.

The backup storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, or an object or cloud storage service. In an embodiment, the storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, the storage may represent logical storage that includes any number of physical storage devices connected to form a logical storage.

One or more of storage units 140A-N of the backup storage system may operate as an active storage tier to receive and store the latest or most recent data while one or more of another of the storage units operates as a long-term storage tier to periodically archive older data from the active storage tier according to an archiving or data retention policy. Metadata, such as metadata 145A-N, may be stored along with data segments 150A-N in one or more storage units. The metadata may include fingerprints corresponding to the segments, namespace, and other data structures to facilitate the deduplication, organization, retrieval, and reconstruction of the segments.

The nodes or servers of the cluster are responsible for handling in parallel different portions or tasks of a data protection operation or job, such as a backup or restore. The nodes (or servers) may be referred to as resource providers. The clients may be referred to as resource consumers. A node has a finite, limited, or fixed amount of resources it can provide based on its hardware capacity and processing power. Such resources may include for example, a maximum or threshold number of streams, threads, or quotas. The resource allocation manager may store or access configuration information specifying, for each type of resource, a maximum number of units of a resource that a node can support.

In a single node or distributed/scale-out cluster environment, allocation of resources can often turn out to be a challenging task. Add to that, the resource allocation criteria should also ensure fair allocation of resources to different clients. It is desirable to prevent any one client from acquiring all the available resources on the server, and to throttle requests for a particular client if needed. A lack of proper resource allocation can result in over-taxing or overloading one or more nodes of the cluster. This can lead to a degradation in performance of the cluster, increased latencies, processing delays, or even system outage. In an embodiment, systems and techniques are provided to model current resource allocation state and predict future resource allocations using eigenvectors, when resource allocation needs are stretched by eigenvalues.

In an embodiment, the resource allocation manager includes a resource allocation assessment unit 155 and an eigenvalue and vector calculation unit 160. The allocation assessment unit is responsible for the modelling, evaluation, and prediction of resource allocation based on eigenvalues and associated eigenvectors as determined by the eigenvalue and vector calculation unit.

For example, if there are N clients/resource consumers and M nodes/resource producers available, then the resource allocation can be represented by a N×M matrix. An eigenvalue and its corresponding eigenvector can be used to represent the transformation/change in the matrix.

An eigenvector, corresponding to a real nonzero eigenvalue, points in a direction in which it is stretched by the transformation and the eigenvalue is the scale by which it is stretched. If the eigenvalue is negative, the direction is reversed.

In an embodiment, systems and techniques are provided to use a characteristics equation to model current resource allocation state, an eigenvalue to quantify the scale of resource change from its current allocation state, and an eigenvector to predict the direction (increase/decrease) in current resource allocation, corresponding to the eigenvalue.

The word "eigen" as translated from German means "characteristic." Reference to eigenvalues and eigenvectors of a matrix thus refer to finding the characteristics of the matrix.

The eigenvalues of a linear mapping are a measure of the distortion induced by the transformation and the eigenvectors indicate how the distortion is oriented. Geometrically, an eigenvector, corresponding to a real nonzero eigenvalue, points in a direction that is stretched by the transformation and the eigenvalue is the factor by which it is stretched.

Eigenvectors and values exist in pairs: every eigenvector has a corresponding eigenvalue. An eigenvalue is a number, indicating an amount, measurement, or degree of variance there is in the data in that direction. In the example above, the eigenvalue is a number indicating how spread out the data is on the line.

Figure 2:
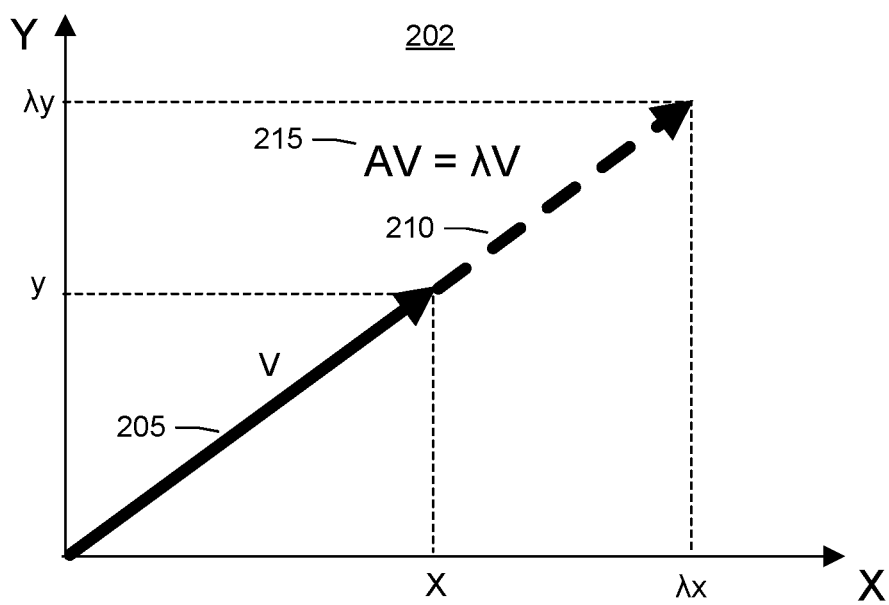
FIG. 2 shows a graph illustrating a geometrical representation of eigenvalues and eigenvectors, according to one or more embodiments.

FIG. 2 shows a Cartesian graph 202 illustrating a geometrical representation of eigenvalues ($\lambda$) and eigenvectors (V). A solid arrow 205 identifies a vector V. As indicated by a broken line arrow 210, a matrix A 215 acts by stretching vector V, not changing its direction. Thus, V is an eigenvector of A.

As noted in FIG. 2, many problems may present themselves in terms of an eigenvalue problem:

$$A \cdot v = \lambda \cdot v \quad \text{Equation 1}$$

In this equation A is an N×N matrix, v is a non-zero N×1 vector and $\lambda$ is a scalar (which may be either real or complex). Any value of $\lambda$ for which this equation has a solution is known as an eigenvalue of the matrix A. It is sometimes also called the characteristic value. The vector, v, which corresponds to this value is called an eigenvector.

The eigenvalue problem can be rewritten as:

$$A \cdot v - \lambda \cdot v = 0$$

$$A \cdot v - \lambda \cdot I \cdot v = 0$$

$$(A \cdot v - \lambda \cdot I) \cdot v = 0$$

If v is non-zero, this equation will only have a solution if:

$$|A - \lambda \cdot I| = \quad \text{Equation 2}$$

This equation is called the characteristic equation of A and is an $n^{th}$ order polynomial in $\lambda$ with n roots.

These roots are called the eigenvalues of A. In an embodiment, the case of n distinct roots is addressed, though they may be repeated. For each eigenvalue there will be an eigenvector for which the eigenvalue equation is true. In an embodiment, a current resource allocation state is modeled based on finding the characteristics equation. This can further facilitate machine learning and predictive refinement of resource allocation schemes.

The following is an example demonstrating the application of eigenvalues and eigenvectors to resource allocation. In this example, consider that the artifact of allocation is a data stream such as a backup data stream. A backup stream includes a sequence of bytes sent from source storage to backup storage. Each stream may be tagged with a unique stream identifier and include a header and other metadata describing the stream. A stream may represent one or more files, directories, or other objects of data being backed up to the backup storage system. Each object in a stream may include data and metadata. Multiple (e.g., two or more) streams may run in parallel with each other.

Table A below shows an example of a 2×2 matrix illustrating the number of clients and their allocation of streams on different nodes of a cluster.

TABLE A

|    | N1 | N2 |
|----|----|----|
| C1 | 2  | 3  |
| C2 | 2  | 1  |

In the example shown in table A above, the nodes of the cluster form a row of the matrix, the clients form a column of the matrix, and a number at an intersection of a row and column indicates a number of units of a resource being provided by a respective node and consumed by a respective client. Thus, according to the matrix, a client C1 has been allocated 2 streams on node N1 and 3 streams on node N2. Client C2 has been allocated 2 streams on node N1 and 1 stream on node N2.

In an embodiment, a technique involves finding the characteristics of the current stream resource allocation and calculating the eigenvalue (and corresponding eigenvector) to evaluate scaling (and the direction of scaling) of the current resource allocation. Calculating the eigenvector provides insight and understanding into the stream resource allocation for the desired scaling.

For example, let the current stream resource allocation be represented as shown in the matrix of table A above. Let the matrix be the "A" matrix.

The characteristic equation of this matrix, its eigen value and corresponding vectors can be calculated as follows. Applying equation 2 above to the matrix results in the following:

$$|A - \lambda I| = \begin{vmatrix} 2 - \lambda & 3 \\ 2 & 1 - \lambda \end{vmatrix} = 0$$

$$= 2 - 3\lambda + \lambda^2 - 6 = 0$$

$$= \lambda^2 - 3\lambda - 4 = 0$$

$$= (\lambda - 4)(\lambda + 1) = 0$$

Thus, the two eigenvalues of the above equation are 4 and −1, i.e., ($\lambda$=4 and $\lambda$=−1).

The eigenvector for the eigenvalue of 4 ($\lambda$=4) may be found as follows:

According to equation 1 above:

$$A \cdot v = \lambda \cdot v$$

Let the eigenvector $$v = \begin{bmatrix} X \\ Y \end{bmatrix}$$

$$(A - \lambda \cdot I) \cdot v = 0$$

$$\left( \begin{bmatrix} 2 & 3 \\ 2 & 1 \end{bmatrix} - \begin{bmatrix} \lambda & 0 \\ 0 & \lambda \end{bmatrix} \right) \cdot \begin{bmatrix} X \\ Y \end{bmatrix} = 0$$

$$\begin{bmatrix} 2-\lambda & 3 \\ 2 & 1-\lambda \end{bmatrix} \cdot \begin{bmatrix} X \\ Y \end{bmatrix} = 0$$

Substituting $\lambda$=4, results in the following:

$$\begin{bmatrix} -2 & 3 \\ 2 & -3 \end{bmatrix} \cdot \begin{bmatrix} X \\ Y \end{bmatrix} = 0$$

This yields two equations:

(−2$X$+3$Y$)=0 and (2$X$−3$Y$)=0, i.e., $X$=3 and $Y$=2

Thus, the eigenvector for the eigenvalue of $\lambda$=4 is:

$$v = \begin{bmatrix} 3 \\ 2 \end{bmatrix}$$

That is, an eigenvector of 3 by 2.

Similar calculations may be used to calculate the eigenvector corresponding to the eigenvalue of −1. That is, the eigenvector for the eigenvalue $\lambda$=−1 may be found as follows:

According to equation 1 above:

$$A \cdot v = \lambda \cdot v$$

Let the eigenvector $$v = \begin{bmatrix} X \\ Y \end{bmatrix}$$

$$(A - \lambda \cdot I) \cdot v = 0$$

$$\left( \begin{bmatrix} 2 & 3 \\ 2 & 1 \end{bmatrix} - \begin{bmatrix} \lambda & 0 \\ 0 & \lambda \end{bmatrix} \right) \cdot \begin{bmatrix} X \\ Y \end{bmatrix} = 0$$

$$\begin{bmatrix} 2-\lambda & 3 \\ 2 & 1-\lambda \end{bmatrix} \cdot \begin{bmatrix} X \\ Y \end{bmatrix} = 0$$

Substituting $\lambda$=−1, results in the following:

$$\begin{bmatrix} 3 & 3 \\ 2 & 2 \end{bmatrix} \cdot \begin{bmatrix} X \\ Y \end{bmatrix} = 0$$

This yields two equations:

(3$X$+3$Y$)=0 and (2$X$=2$Y$)=0, i.e., $X$=1 and $Y$=−1

Thus, the eigenvector for the eigenvalue of $\lambda$=−1 is:

$$v = \begin{bmatrix} 1 \\ -1 \end{bmatrix}$$

That is, an eigenvector of 1 by −1.

Figure 3:
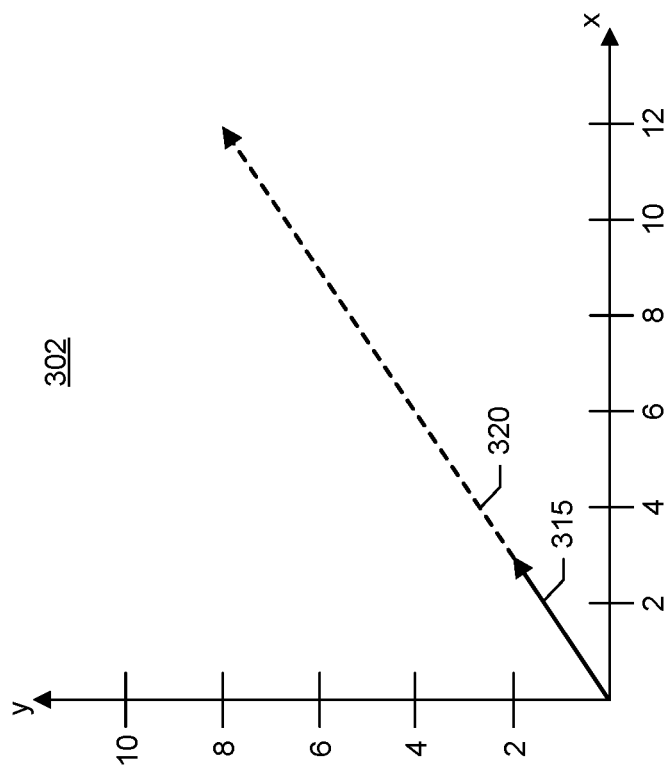
FIG. 3 shows another graph illustrating a geometrical representation of eigenvalues and eigenvectors, according to one or more embodiments.

FIG. 3 shows a Cartesian graph 302 illustrating a geometrical representation for the eigenvector $$v = \begin{bmatrix} 3 \\ 2 \end{bmatrix}$$

stretched by the eigenvalue $\lambda$=4. FIG. 3 shows a scaling up (increasing) of the current stream allocation by a factor of 4. In particular, a solid line arrow 315 indicates the 3 by 2 eigenvector and a broken line arrow 320 indicates the scaling by the eigenvalue of 4.

Figure 4:
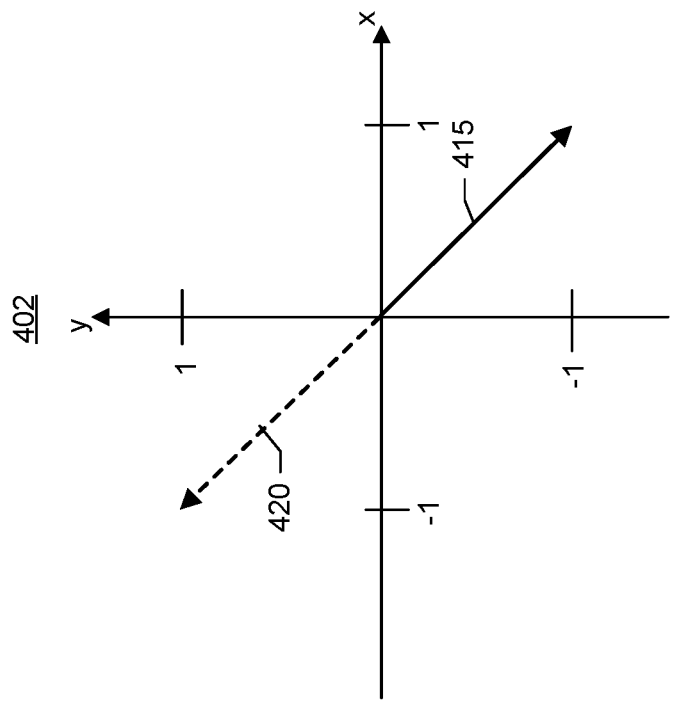
FIG. 4 shows another graph illustrating a geometrical representation of eigenvalues and eigenvectors, according to one or more embodiments.

FIG. 4 shows a Cartesian graph 402 illustrating a geometrical representation for the for the eigenvector $$v = \begin{bmatrix} 1 \\ -1 \end{bmatrix}$$

stretched by the eigenvalue $\lambda$=−1. FIG. 4 shows a scaling down (decreasing) of the current stream allocation by a factor of 1. In particular, a solid line arrow 415 indicates the 1 by −1 eigenvector and a broken line arrow 420 indicates the scaling by the eigenvalue of −1.

The following observations may be made from the example shown in table A above and accompanying analysis:

1) The initial current stream allocation state included two clients on two nodes of the cluster.

2) The characteristic equation of the current stream allocation was obtained and calculations were performed to find the eigenvalues (which indicates the scalability factor) and the corresponding eigenvectors (which indicates the direction of scale) of the current stream allocation.

3) As shown in FIG. 3, with an eigenvalue of 4, i.e., if the current stream allocation were to be scaled up by a factor of 4, the stream allocation strategy would be governed by the eigenvector of $$v = \begin{bmatrix} 3 \\ 2 \end{bmatrix}.$$

4) This means that in order to maintain the current state, client C1 and C2 would be allocated streams in the ratio of 3:2 from N1 and N2. For example, if 20 new streams need to be allocated, the stream allocation would be 12 from N1 and 8 from N2. (12:8=N1:N2).

5) As shown in FIG. 3, with a eigenvalue of −1, i.e. if we current stream allocation were to be scaled down by a factor of −1, the stream allocation strategy would be governed by the eigenvector of $$v = \begin{bmatrix} 1 \\ -1 \end{bmatrix}.$$

6) This means that in order to maintain the current state, client C1 and C2 would need to scale down its streams in the ratio of 1:−1 from N1 and N2. For example, if 1 new stream needs to be released, it would be released in the order of 0 from N1 and 1 from N2. (1:−1=N1:N2).

Thus, in an embodiment, any current resource allocation (stream resource for example) state can be evaluated using its characteristics equation, its eigenvalue can be calculated to determine the scale of distortion tolerated, and the corresponding eigenvectors can be used to calculate the direction of scaling and its effect on allocation of resources relative to current allocation.

Figure 5:
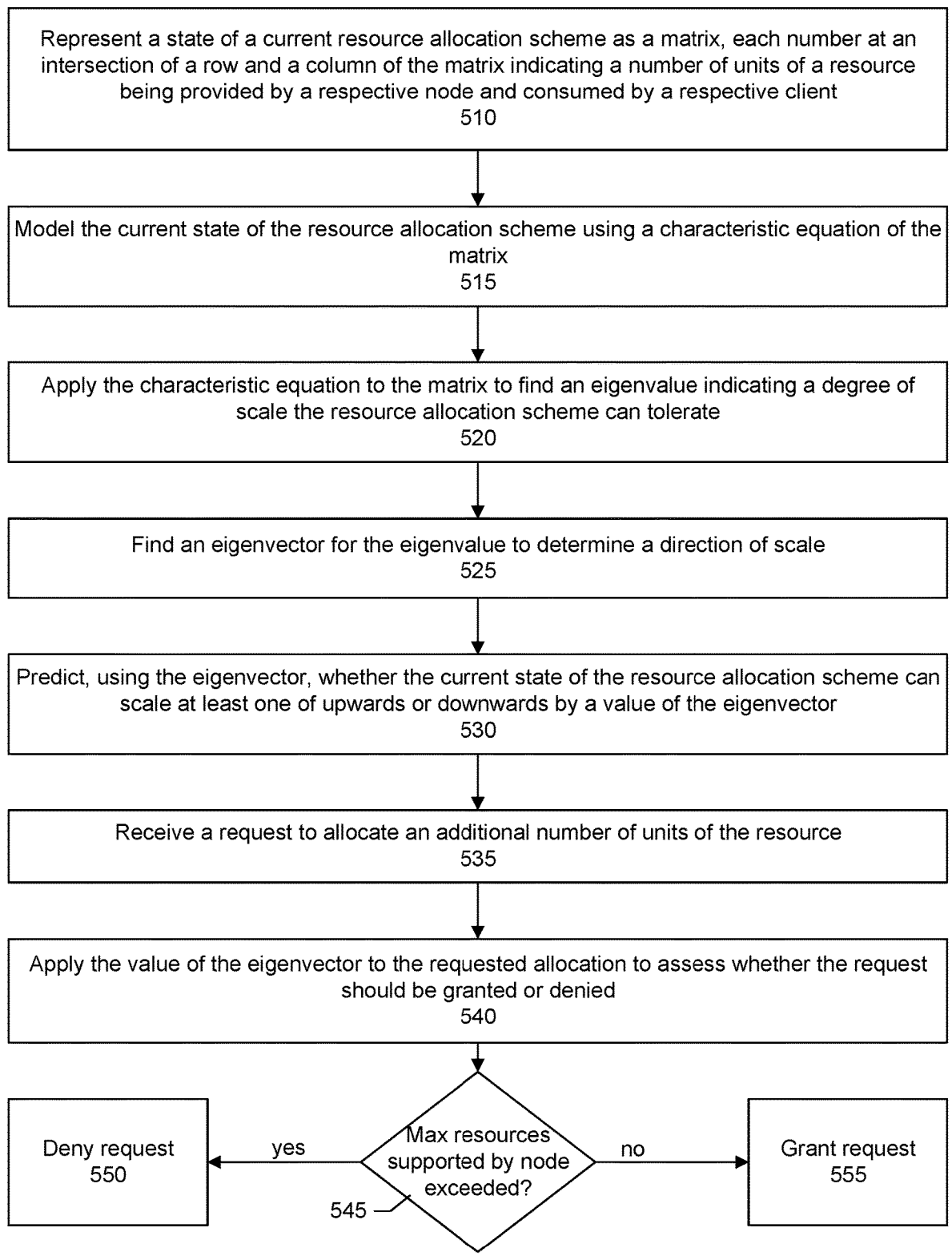
FIG. 5 shows an overall flow for modelling and predicting resource allocation using eigenvalues and eigenvectors, according to one or more embodiments.

FIG. 5 shows an overall flow for modelling and predicting resource allocation between clients that consume resources and nodes of a cluster that provide the resources. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 510, a state of a current resource allocation scheme is represented as a matrix. In the matrix, each number at an intersection of a row and a column of the matrix indicates a number of units of a resource being provided by a respective node and consumed by a respective client.

In a step 515, the current state of the resource allocation scheme is modeled using a characteristic equation of the matrix. In a step 520, the characteristic equation is applied to the matrix to find an eigenvalue of the matrix. The characteristic equation is the equation that may be solved to find a matrix's eigenvalues. The eigenvalue indicates a degree, level, measurement, or amount of scale the resource allocation scheme can tolerate. In a step 525, an eigenvector is found for the eigenvalue to determine a direction of scale.

In a step 530, a prediction is made, using the eigenvector, whether the current state of the resource allocation scheme may scale at least one of upwards or downwards by a value of the eigenvector. In an embodiment, the predicting includes receiving a request to allocate an additional number of units of the resource. In an embodiment, the request corresponds to a backup stream which, in turn, represents a file to be backed up. The request may originate from one or more clients. In a step 540, the eigenvector is applied to the requested allocation to assess whether the request should be granted or denied. In a step 545, a determination is made as to whether if after the allocation any node would exceed a maximum number of units of the resource supported by or available to a node. If so, the request is denied (step 550).

Alternatively, if each node will be below the maximum number of units of the resource available to the node, the request is granted (step 555).

Consider, as an example, a resource as being backup streams. In an embodiment, clients can request streams to complete a backup job. The server is responsible for granting or denying those streams. For the purpose of this example, it is assumed that the stream request from a client can land on different nodes of a cluster. This is the case of a spanned m-tree or a stitched namespace on which clients are performing the backup or recovery job on.

A server may grant a client the requested stream, if it is possible for all streams to finish executing. Since the server cannot know when a client stream will terminate, or how many more streams different clients will have requested by then, the server may assume that all clients will eventually attempt to acquire their stated maximum streams and will use the streams and release them.

A server has fixed set of streams. If the current allocation scheme and the scale and direction of scale, does not result in exceeding the maximum number of streams, the current allocation strategy is considered safe.

Given that assumption, it is important to model the current/point-in-time stream allocation model. In an embodiment, this is accomplished using the Eigen characteristic equation and then calculating the eigenvalue and eigenvector of that model. A determination is then made as to how much stretch (i.e., eigenvalue) the current stream allocation state can tolerate, in which direction (i.e., eigenvector). Future predictive stream allocation can be made based on these values, e.g., is it safe to apply the stretch factor in the direction of scale. The future/predictive resource allocation to maintain current state or change allocation strategy can be guided by the eigenvalue and vector calculations.

The modelling technique allows for achieving a fair stream allocation, thus helping to prevent one or more consumer/client from acquiring too many streams at the detriment of another consumer/client. This is facilitated by understanding how much tolerance the current resource allocation has when scaled.

More particularly, consider that a server or node has fixed set or number of streams that it can support. In an embodiment, a technique involves assessing whether the current allocation scheme and the scale and direction of scale, does or does not result in exceeding the maximum number of streams that a node can support. The current allocation strategy may be considered safe if the maximum number of streams is not exceeded. The following example shows a safe allocation.

Consider that a cluster includes first and second nodes N1 and N2, respectively. A total maximum number of streams available on the first node is 20. A total maximum number of streams available on the second node is 20. The clients include first and second clients C1 and C2, respectively. The current stream allocation to clients C1 and C2 includes two streams allocated from the first node N1 to the first client C1, two streams allocated from the first node N1 to the second client C2, three streams allocated from the second node N2 to the first client C1, and one stream allocated from the second node N2 to the second client C2. Thus, first node N1 is supporting a total number of four streams (e.g., 2+2=4) and second node N2 is supporting a total number of four streams (e.g., 3+1=4).

A matrix is generated to represent a current state of the resource allocation scheme (step 510, FIG. 5). Table B below shows an example of a matrix A:

TABLE B

|    | N1 | N2 |
|----|----|----|
| C1 | 2  | 3  |
| C2 | 2  | 1  |

A next step includes determining by how much the above stream allocation model will scale and if it will be safe given the maximum streams available on each node. This accomplished by obtaining the characteristic equation of the current stream allocation represented by the above matrix shown in table B and calculating the eigenvalues (which indicates to the scalability factor) and the corresponding eigenvectors (which indicate the direction of scale) of the current stream allocation. (see, e.g., steps 515-525, FIG. 5).

The characteristic equation is solved to find the matrix's eigenvalue of 4. Equation 1 can then be solved using the eigenvalue of 4 to obtain a corresponding eigenvector of $$v = \begin{bmatrix} 3 \\ 2 \end{bmatrix}.$$

Thus, scaling me current stream allocation by a factor of 4 requires using the stream allocation strategy governed by the eigenvector of $$v = \begin{bmatrix} 3 \\ 2 \end{bmatrix}.$$

FIG. 3 shows a graphical representation of a 3 by 2 eigenvector stretched by an eigenvalue of 4.

This means that in order to maintain the current state, first and second clients C1 and C2, respectively, would be allocated streams in the ratio of 3:2 from N1 and N2. That is, if 20 new streams need to be allocated, the stream allocation would be 12 from N1 and 8 from N2 (12:8=N1: N2).

Given that first node N1 has already allocated 4 streams, and can support a maximum of 20 streams, allocating an extra 12 streams would be okay or safe (e.g., 4 streams+12 streams=16 streams which is less than 20 streams). In other words, a current number of streams currently being supported is added or summed with an additional number of streams to be supported to obtain a total number of streams that will be supported after the allocation. Given that second node N2 has already allocated 4 streams, and can support a maximum of 20 streams, allocating an extra 8 streams would be okay or safe (e.g., 4 streams+8 streams=12 streams which is less than 20 streams). So, scaling the current stream allocation by a factor of 4 would be safe.

As an example of an unsafe scaling, consider that rather than each node being able to support a maximum 20 streams, each node can only support a maximum of 12 streams. Again, a server or node has fixed set of streams it can support. If the current allocation scheme and the scale and direction of scale, does not result in exceeding the maximum number of streams, the current allocation strategy is considered safe. The following shows an example of an unsafe current allocation on applicability of scale and stretch.

Consider that a cluster includes first and second nodes N1 and N2, respectively. A total maximum number of streams available on the first node is 12. A total maximum number of streams available on the second node is 12. The clients include first and second clients C1 and C2, respectively. The current stream allocation to clients C1 and C2 includes two streams allocated from the first node N1 to the first client C1, two streams allocated from the first node N1 to the second client C2, three streams allocated from the second node N2 to the first client, and one stream allocated from the second node N2 to the second client C2. Thus, first node N1 is supporting a total number of four streams (e.g., 2+2=4) and second node N2 is supporting a total number of four streams (e.g., 3+1=4).

A matrix is generated to represent a current state of the resource allocation scheme (step 510, FIG. 5). Table C below shows an example of a matrix A:

TABLE C

|    | N1 | N2 |
|----|----|----|
| C1 | 2  | 3  |
| C2 | 2  | 1  |

A next step includes determining by how much the above stream allocation model will scale and if it will be safe given the maximum streams available on each node. This is accomplished by obtaining the characteristic equation of the current stream allocation represented by the above matrix shown in table C and calculating the eigenvalues (which indicates the scalability factor) and the corresponding eigenvectors (which indicate the direction of scale) of the current stream allocation. (see, e.g., steps 515-525, FIG. 5).

The characteristic equation is solved to find the matrix's eigenvalue of 4. Equation 1 can then be solved using the eigenvalue of 4 to obtain a corresponding eigenvector of $$v = \begin{bmatrix} 3 \\ 2 \end{bmatrix}.$$

Thus, scaling the current stream allocation by a factor of 4 requires using the stream allocation strategy governed by the eigenvector of $$v = \begin{bmatrix} 3 \\ 2 \end{bmatrix}.$$

FIG. 3 shows a graphical representation of a 3 by 2 eigenvector stretched by an eigenvalue of 4.

This means that in order to maintain the current state, first and second clients C1 and C2, respectively, would be allocated streams in the ratio of 3:2 from N1 and N2. That is, if 20 new streams need to be allocated, the stream allocation would be 12 from N1 and 8 from N2 (12:8=N1: N2).

Given that first node N1 has already allocated 4 streams, and can support a maximum of 12 streams, allocating an extra 12 streams would not be okay or safe (e.g., 4 streams+12 streams=16 streams which is greater than 12 streams. So, scaling the current stream allocation by a factor of 4 would be unsafe in this case.

As discussed, modelling current resources allocation (streams for example), helps to determine the degree, direction and scale of distortion of the current resource allocation. This helps to facilitate a much more efficient and equitable scaling of resources as compared to using streams based on application requested stream quota or on a per request basis.

Future resource allocation/deallocation can be made based on degree of scale (eigenvalue) and the direction of scale (eigenvector).

Predicting safe/unsafe resource allocation states based on scale and direction of scale, allows the server to determine its current resource allocation model. This also provides guidance to the clients and the backup applications on how much load to apply to the system.

The current state modelling and calculation of tolerance in the current allocation scheme also provides guidance on achieving a fair, equitable, or efficient stream allocation and hence preventing one consumer/client from acquiring all the streams at the detriment of other consumers/clients. This can be accomplished by understanding how much tolerance the current resource allocation has when scaled. The modelling of current resource allocation state—including with the tolerance it can accommodate—helps to predict how much resource will be needed in the future. If the total number of resources in the systems are not sufficient, then the request for the resources could be denied, based on the current resource allocation scheme.

In an embodiment, there is a method of modelling and predicting resource allocation between clients that consume resources and nodes of a cluster that provide the resources, the method comprising: representing a current state of a resource allocation scheme as a matrix, each number at an intersection of a row and a column of the matrix indicating a number of units of a resource being provided by a respective node and consumed by a respective client; modelling the current state of the resource allocation scheme using a characteristic equation of the matrix; applying the characteristic equation to the matrix to find an eigenvalue indicating a degree of scale the resource allocation scheme can tolerate; finding an eigenvector for the eigenvalue to determine a direction of scale; and predicting, using the eigenvector, whether the current state of the resource allocation scheme can scale at least one of upwards or downwards by a value of the eigenvector, the predicting comprising: receiving a request to allocate an additional number of units of the resource; applying the value of the eigenvector to the requested allocation to assess whether the request should be granted or denied; and if application of the value of the eigenvector to the requested allocation results in a node exceeding a maximum number of units of the resource available to the node, denying the request.

In an embodiment, the resource being provided by the respective node comprises a backup stream. In an embodiment, the value of the eigenvector comprises a ratio, and the assessment of whether the request should be granted or denied further comprises: determining whether allocating the additional number of units of the resource from the nodes according to the ratio results in the node exceeding the maximum number of units of the resource available to the node. In an embodiment, the assessment of whether the request should be granted or denied further comprises: determining whether allocating the additional number of units of the resource from the nodes according to the ratio results in the node remaining below the maximum number of units of the resource available to the node; if the node will remain below the maximum number of units of the resource available to the node, granting the request.

In an embodiment, the nodes of the cluster comprise first and second nodes, the first node providing a first current number of units of the resource and being able to support a first maximum number of units of the resource, the second node providing a second current number of units of the resource and being able to support a second maximum number of units of the resource, and the method further comprises: determining, according to the value of the eigenvector, a first additional number of the additional number of units of the resource to be provided by the first node, and a second additional number of the additional number of units of the resource to be provided by the second node; calculating a first total number of units of the resource to be provided by the first node by summing the first current number of units being provided by the first node and the first additional number of units to be provided by the first node; if the first total number of units of the resource to be provided by the first node exceeds the first maximum number of units, denying the request; calculating a second total number of units of the resource to be provided by the second node by summing the second current number of units being provided by the second node and the second additional number of units to be provided by the second node; and if the second total number of units of the resource to be provided by the second node exceeds the second maximum number of units, denying the request.

In an embodiment, the method includes: applying the characteristic equation of the matrix to find a second eigenvalue, the second eigenvalue being a negative value; finding a second eigenvector for the second eigenvalue; and scaling down the resources according to the second eigenvector.

In another embodiment, there is a system for modelling and predicting resource allocation between clients that consume resources and nodes of a cluster that provide the resources, the system comprising: a processor; and memory configured to store one or more sequences of instructions which, when executed by the processor, cause the processor to carry out the steps of: representing a current state of a resource allocation scheme as a matrix, each number at an intersection of a row and a column of the matrix indicating a number of units of a resource being provided by a respective node and consumed by a respective client; modelling the current state of the resource allocation scheme using a characteristic equation of the matrix; applying the characteristic equation to the matrix to find an eigenvalue indicating a degree of scale the resource allocation scheme can tolerate; finding an eigenvector for the eigenvalue to determine a direction of scale; and predicting, using the eigenvector, whether the current state of the resource allocation scheme can scale at least one of upwards or downwards by a value of the eigenvector, the predicting comprising: receiving a request to allocate an additional number of units of the resource; applying the value of the eigenvector to the requested allocation to assess whether the request should be granted or denied; and if application of the value of the eigenvector to the requested allocation results in a node exceeding a maximum number of units of the resource available to the node, denying the request.

In another embodiment, there is a computer program product, comprising a non-transitory computer-readable medium having a computer-readable program code embodied therein, the computer-readable program code adapted to be executed by one or more processors to implement a method of modelling and predicting resource allocation between clients that consume resources and nodes of a cluster that provide the resources, the method comprising: representing a current state of a resource allocation scheme as a matrix, each number at an intersection of a row and a column of the matrix indicating a number of units of a resource being provided by a respective node and consumed by a respective client; modelling the current state of the resource allocation scheme using a characteristic equation of the matrix; applying the characteristic equation to the matrix to find an eigenvalue indicating a degree of scale the resource allocation scheme can tolerate; finding an eigenvector for the eigenvalue to determine a direction of scale; and predicting, using the eigenvector, whether the current state of the resource allocation scheme can scale at least one of upwards or downwards by a value of the eigenvector, the predicting comprising: receiving a request to allocate an additional number of units of the resource; applying the value of the eigenvector to the requested allocation to assess whether the request should be granted or denied; and if application of the value of the eigenvector to the requested allocation results in a node exceeding a maximum number of units of the resource available to the node, denying the request.

In another embodiment, there is a method comprising: representing a current state of a resource allocation scheme as a matrix, each number at an intersection of a row and a column of the matrix indicating a number of units of a resource being provided by a respective node of a plurality of nodes and consumed by a respective client of a plurality of clients; obtaining a characteristic equation of the matrix; solving the characteristic equation to obtain an eigenvalue; finding an eigenvector corresponding to the eigenvalue; allocating an additional number of units of the resource according to the eigenvector; and terminating the allocating when a node of the plurality of nodes reaches a maximum number of units of the resource supported by the node.

In another embodiment, there is a method comprising: representing a current state of a resource allocation scheme as a matrix, each number at an intersection of a row and a column of the matrix indicating a number of units of a resource being provided by a respective node of a plurality of nodes and consumed by a respective client of a plurality of clients; obtaining a characteristic equation of the matrix; solving the characteristic equation to obtain an eigenvalue; finding an eigenvector corresponding to the eigenvalue; and scaling one of up or down the number of units of the resource according to the eigenvector.

Figure 6:
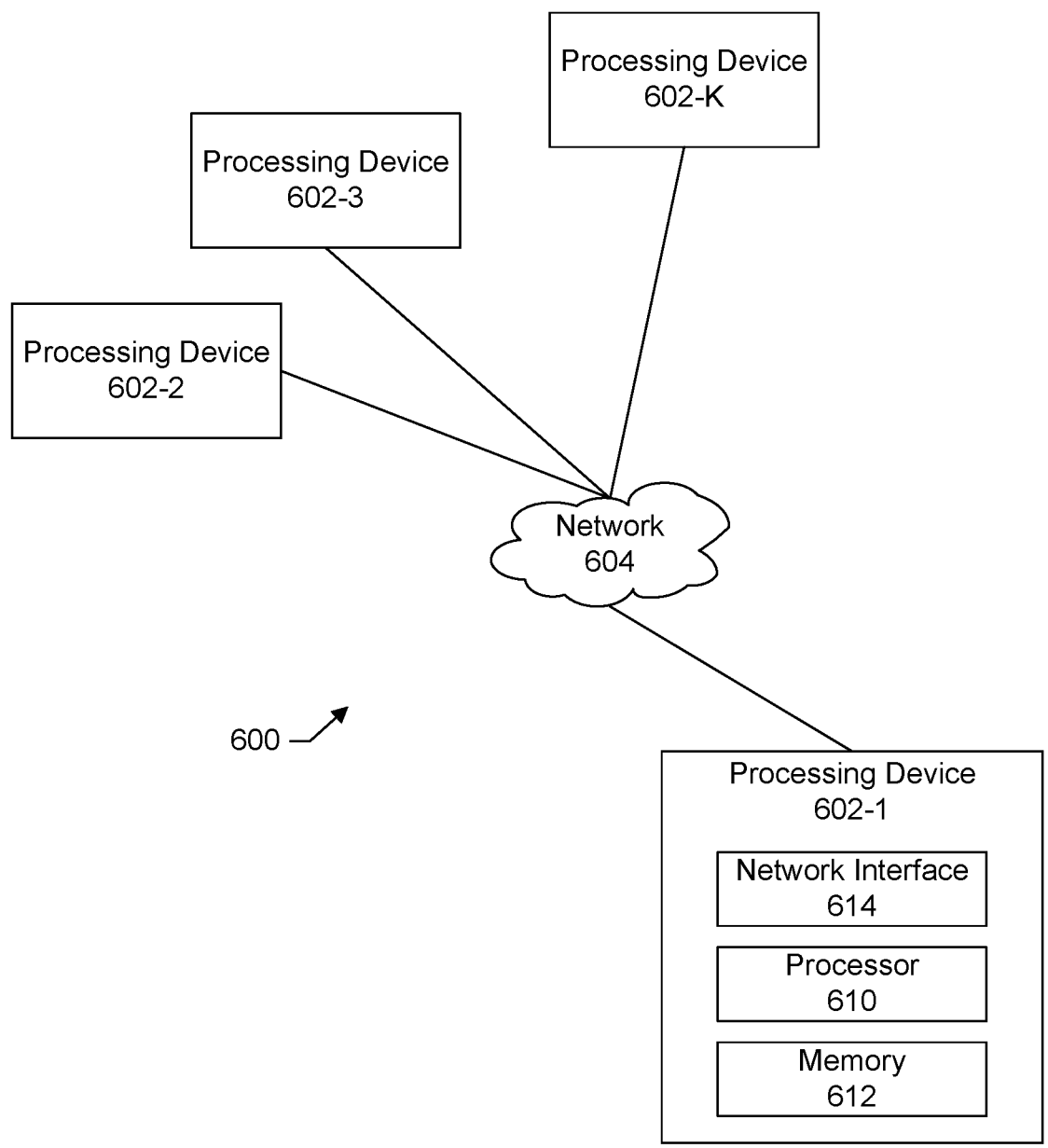
FIG. 6 shows a block diagram of a processing platform that may be utilized to implement at least a portion of an information processing system, according to one or more embodiments.

FIG. 6 shows an example of a processing platform 600 that may include at least a portion of system 100. The example shown in FIG. 6 includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 7:
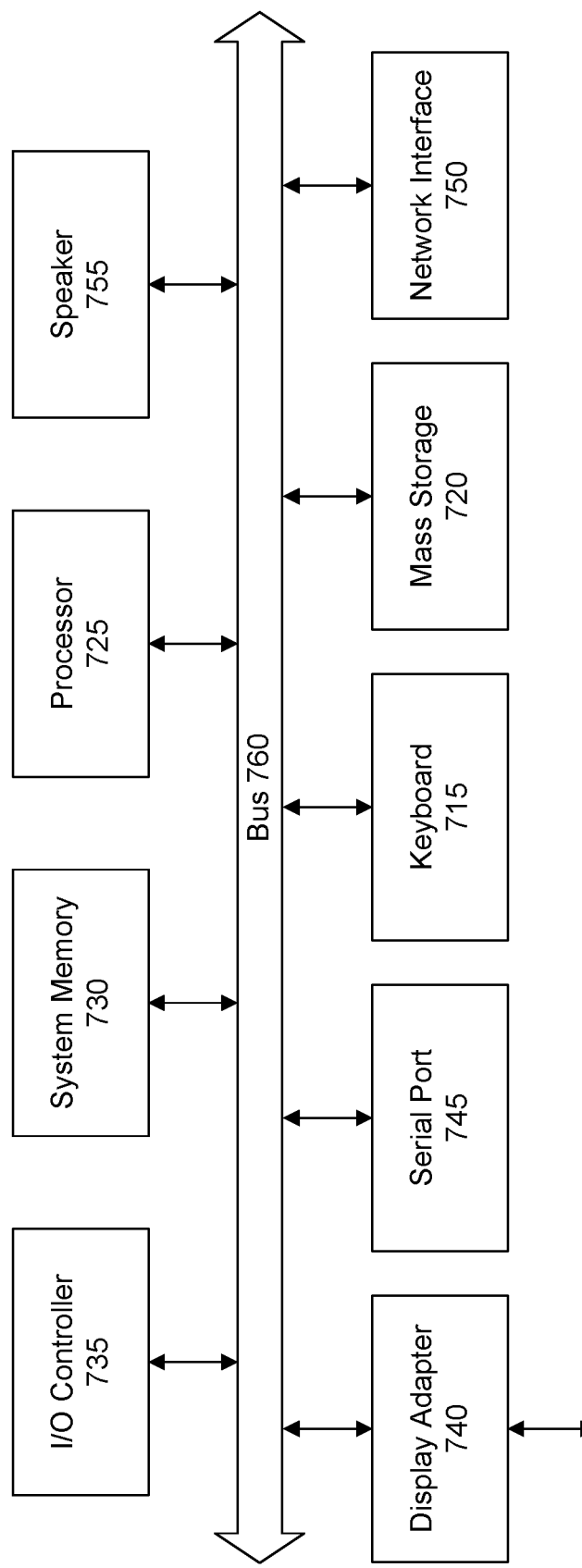
FIG. 7 shows a block diagram of a computer system suitable for use with the system, according to one or more embodiments.

FIG. 7 shows a system block diagram of a computer system 705 used to execute the software of the present system described herein. The computer system includes a monitor 707, keyboard 715, and mass storage devices 720. Computer system 705 further includes subsystems such as central processor 725, system memory 730, input/output (I/O) controller 735, display adapter 740, serial or universal serial bus (USB) port 745, network interface 750, and speaker 755. The system may also be used with computer systems with additional or fewer subsystems. For example, a computer system could include more than one processor 725 (i.e., a multiprocessor system) or a system may include a cache memory.

Arrows such as 760 represent the system bus architecture of computer system 705. However, these arrows are illustrative of any interconnection scheme serving to link the subsystems. For example, speaker 755 could be connected to the other subsystems through a port or have an internal direct connection to central processor 725. The processor may include multiple processors or a multicore processor, which may permit parallel processing of information. Computer system 705 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of modelling and predicting resource allocation between clients that consume resources and nodes of a cluster that provide the resources, the method comprising:

representing a current state of a resource allocation scheme as a matrix, each number at an intersection of a row and a column of the matrix indicating a number of units of a resource being provided by a respective node and consumed by a respective client;

modelling the current state of the resource allocation scheme using a characteristic equation of the matrix;

applying the characteristic equation to the matrix to find an eigenvalue indicating a degree of scale the resource allocation scheme can tolerate;

finding an eigenvector for the eigenvalue to determine a direction of scale; and predicting, using the eigenvector, whether the current state of the resource allocation scheme can scale at least one of upwards or downwards by a value of the eigenvector.

2. The method of claim 1 wherein the resource being provided by the respective node comprises a backup stream.

3. The method of claim 1 wherein the predicting further comprises:

receiving a request to allocate an additional number of units of the resource;

applying the value of the eigenvector to the requested allocation to assess whether the request should be granted or denied; and if application of the value of the eigenvector to the requested allocation results in a node exceeding a maximum number of units of the resource available to the node, denying the request.

4. The method of claim 3 wherein the value of the eigenvector comprises a ratio, and the assessment of whether the request should be granted or denied further comprises:

determining whether allocating the additional number of units of the resource from the nodes according to the ratio results in the node remaining below the maximum number of units of the resource available to the node; and if the node will remain below the maximum number of units of the resource available to the node, granting the request.

5. The method of claim 3 wherein the nodes of the cluster comprise first and second nodes, the first node providing a first current number of units of the resource and being able to support a first maximum number of units of the resource, the second node providing a second current number of units of the resource and being able to support a second maximum number of units of the resource, and the method further comprises:

determining, according to the value of the eigenvector, a first additional number of the additional number of units of the resource to be provided by the first node, and a second additional number of the additional number of units of the resource to be provided by the second node;

calculating a first total number of units of the resource to be provided by the first node by summing the first current number of units being provided by the first node and the first additional number of units to be provided by the first node;

if the first total number of units of the resource to be provided by the first node exceeds the first maximum number of units, denying the request;

calculating a second total number of units of the resource to be provided by the second node by summing the second current number of units being provided by the second node and the second additional number of units to be provided by the second node; and if the second total number of units of the resource to be provided by the second node exceeds the second maximum number of units, denying the request.

6. The method of claim 1 further comprising:
applying the characteristic equation of the matrix to find a second eigenvalue, the second eigenvalue being a negative value;
finding a second eigenvector for the second eigenvalue; and
scaling down the resources according to the second eigenvector.

7. A system for modelling and predicting resource allocation between clients that consume resources and nodes of a cluster that provide the resources, the system comprising: a processor; and memory configured to store one or more sequences of instructions which, when executed by the processor, cause the processor to carry out the steps of:
representing a current state of a resource allocation scheme as a matrix, each number at an intersection of a row and a column of the matrix indicating a number of units of a resource being provided by a respective node and consumed by a respective client;
modelling the current state of the resource allocation scheme using a characteristic equation of the matrix;
applying the characteristic equation to the matrix to find an eigenvalue indicating a degree of scale the resource allocation scheme can tolerate;
finding an eigenvector for the eigenvalue to determine a direction of scale; and
predicting, using the eigenvector, whether the current state of the resource allocation scheme can scale at least one of upwards or downwards by a value of the eigenvector.

8. The system of claim 7 wherein the resource being provided by the respective node comprises a backup stream.

9. The system of claim 7 wherein the predicting further comprises:
receiving a request to allocate an additional number of units of the resource;
applying the value of the eigenvector to the requested allocation to assess whether the request should be granted or denied; and
if application of the value of the eigenvector to the requested allocation results in a node exceeding a maximum number of units of the resource available to the node, denying the request.

10. The system of claim 9 wherein the value of the eigenvector comprises a ratio, and the assessment of whether the request should be granted or denied further comprises:
determining whether allocating the additional number of units of the resource from the nodes according to the ratio results in the node remaining below the maximum number of units of the resource available to the node;
if the node will remain below the maximum number of units of the resource available to the node, granting the request.

11. The system of claim 9 wherein the nodes of the cluster comprise first and second nodes, the first node providing a first current number of units of the resource and being able to support a first maximum number of units of the resource, the second node providing a second current number of units of the resource and being able to support a second maximum number of units of the resource, and the processor further carries out the steps of:
determining, according to the value of the eigenvector, a first additional number of the additional number of units of the resource to be provided by the first node, and a second additional number of the additional number of units of the resource to be provided by the second node;
calculating a first total number of units of the resource to be provided by the first node by summing the first current number of units being provided by the first node and the first additional number of units to be provided by the first node;
if the first total number of units of the resource to be provided by the first node exceeds the first maximum number of units, denying the request;
calculating a second total number of units of the resource to be provided by the second node by summing the second current number of units being provided by the second node and the second additional number of units to be provided by the second node; and
if the second total number of units of the resource to be provided by the second node exceeds the second maximum number of units, denying the request.

12. The system of claim 7 wherein the processor further carries out the steps of:
applying the characteristic equation of the matrix to find a second eigenvalue, the second eigenvalue being a negative value;
finding a second eigenvector for the second eigenvalue; and
scaling down the resources according to the second eigenvector.

13. A computer program product, comprising a non-transitory computer-readable medium having a computer-readable program code embodied therein, the computer-readable program code adapted to be executed by one or more processors to implement a method of modelling and predicting resource allocation between clients that consume resources and nodes of a cluster that provide the resources, the method comprising:
representing a current state of a resource allocation scheme as a matrix, each number at an intersection of a row and a column of the matrix indicating a number of units of a resource being provided by a respective node and consumed by a respective client;
modelling the current state of the resource allocation scheme using a characteristic equation of the matrix;
applying the characteristic equation to the matrix to find an eigenvalue indicating a degree of scale the resource allocation scheme can tolerate;
finding an eigenvector for the eigenvalue to determine a direction of scale; and
predicting, using the eigenvector, whether the current state of the resource allocation scheme can scale at least one of upwards or downwards by a value of the eigenvector.

14. The computer program product of claim 13 wherein the resource being provided by the respective node comprises a backup stream.

15. The computer program product of claim 13 wherein the predicting further comprises:
receiving a request to allocate an additional number of units of the resource;
applying the value of the eigenvector to the requested allocation to assess whether the request should be granted or denied; and
if application of the value of the eigenvector to the requested allocation results in a node exceeding a maximum number of units of the resource available to the node, denying the request.

16. The computer program product of claim 15 wherein the value of the eigenvector comprises a ratio, and the assessment of whether the request should be granted or denied further comprises:
- determining whether allocating the additional number of units of the resource from the nodes according to the ratio results in the node remaining below the maximum number of units of the resource available to the node;
- if the node will remain below the maximum number of units of the resource available to the node, granting the request.

17. The computer program product of claim 15 wherein the nodes of the cluster comprise first and second nodes, the first node providing a first current number of units of the resource and being able to support a first maximum number of units of the resource, the second node providing a second current number of units of the resource and being able to support a second maximum number of units of the resource, and the method further comprises:
- determining, according to the value of the eigenvector, a first additional number of the additional number of units of the resource to be provided by the first node, and a second additional number of the additional number of units of the resource to be provided by the second node;
- calculating a first total number of units of the resource to be provided by the first node by summing the first current number of units being provided by the first node and the first additional number of units to be provided by the first node;
- if the first total number of units of the resource to be provided by the first node exceeds the first maximum number of units, denying the request;
- calculating a second total number of units of the resource to be provided by the second node by summing the second current number of units being provided by the second node and the second additional number of units to be provided by the second node; and
- if the second total number of units of the resource to be provided by the second node exceeds the second maximum number of units, denying the request.

18. The computer program product of claim 13 wherein the method further comprises:
- applying the characteristic equation of the matrix to find a second eigenvalue, the second eigenvalue being a negative value;
- finding a second eigenvector for the second eigenvalue; and
- scaling down the resources according to the second eigenvector.

* * * * *